(No Model.)

D. COOPER.
MILK TESTING AND SEPARATING MACHINE.

No. 446,248. Patented Feb. 10, 1891.

Witnesses:
Jno. E. Parker
Wm. D. Connor

Inventor
Dyer Cooper
by his Attorneys
Howson & Howson

UNITED STATES PATENT OFFICE.

DYER COOPER, OF PHILADELPHIA, PENNSYLVANIA.

MILK TESTING AND SEPARATING MACHINE.

SPECIFICATION forming part of Letters Patent No. 446,248, dated February 10, 1891.

Application filed July 16, 1888. Serial No. 280,111. (No model.)

*To all whom it may concern:*

Be it known that I, DYER COOPER, a citizen of the United States, and a resident of Philadelphia, Pennsylvania, have invented certain Improvements in Milk Testing and Separating Machines, of which the following is a specification.

The object of my invention is to construct a simple and efficient milk testing and separating machine which can be readily operated by hand or power, but which is specially adapted for use by milk dealers and buyers.

Figure 1:
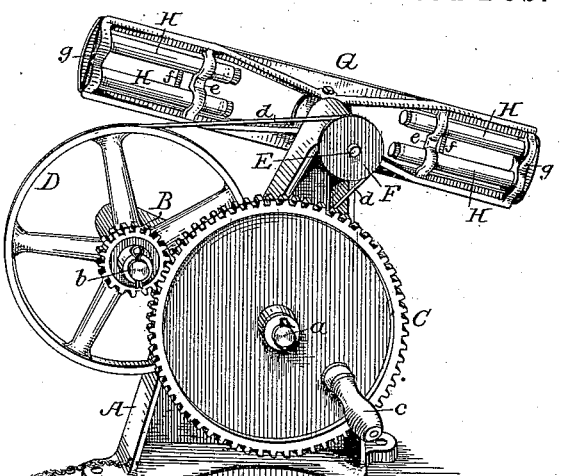
Figure 2:
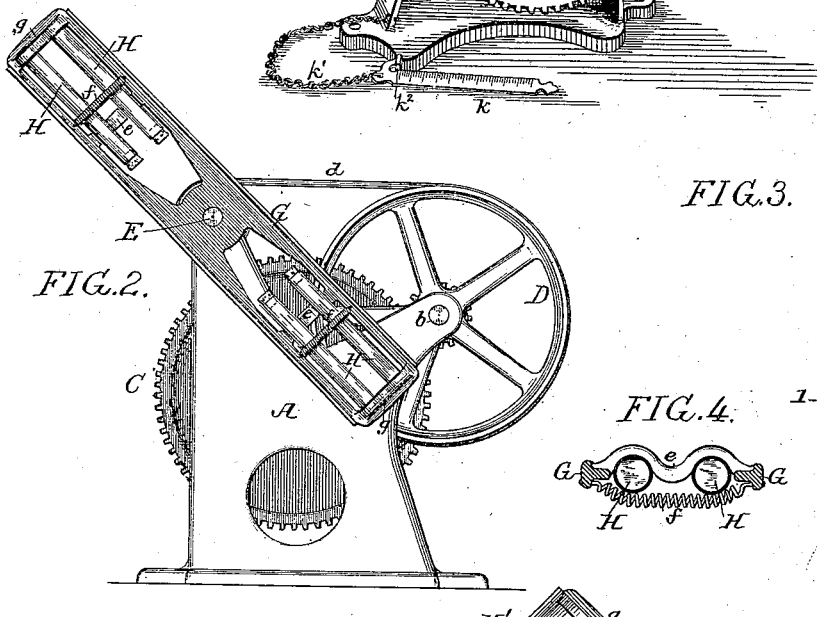
Figure 3:
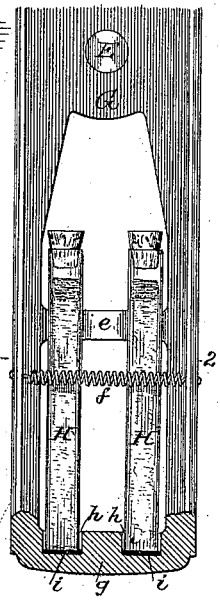
Figure 4:
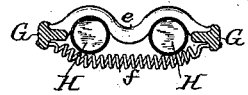
Figure 5:
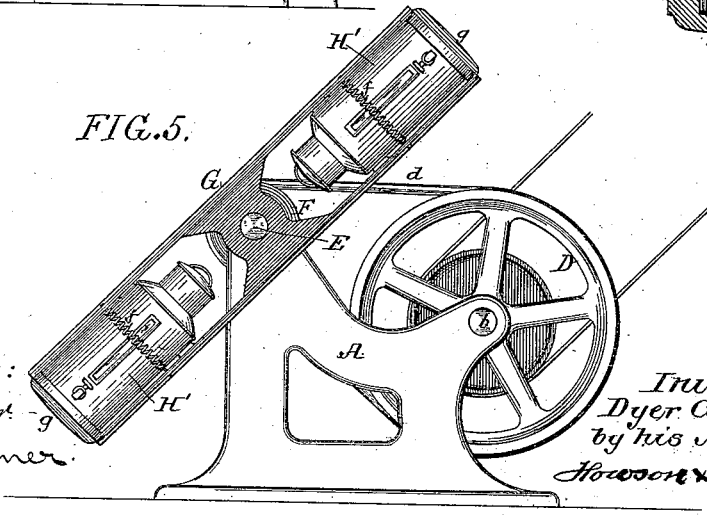

In the accompanying drawings, Figure 1 is a perspective view of my improved milk-testing machine. Fig. 2 is a front view of the same. Fig. 3 is an enlarged section of a portion of the tube-carrying spider forming part of the machine. Fig. 4 is a transverse section on the line 1 2, Fig. 3; and Fig. 5 is a view of the device constructed for use as a milk-separating machine.

A is the frame of the machine, from which projects two studs $a$ and $b$, the stud $a$ forming a bearing for a spur-wheel C, which has a handle $c$, and the stud $b$ forming a bearing for a pinion B, to the hub of which is adapted a belt-wheel D.

E is a horizontal shaft, having its bearings in the frame A and provided at one end with a pulley F, round which and round the pulley D passes a belt $d$. At the opposite end of the shaft E is a spider G, preferably made in the form shown in Figs. 1 and 2, and this spider carries at its outer ends a series of bottles or tubes, as shown, so that as the shaft E is revolved through the medium of the gears and belt-wheels the spider will be rapidly rotated. I prefer to make the arms of the spider open, as shown, in order to expose the testing-tubes, and I make the test-tubes of glass, so that as the spider is revolved the action on the milk may be observed by the operator.

In Figs. 1 and 2 I have shown the spider as carrying four testing-tubes; but it will be understood that a greater or less number may be employed, depending upon the quantity of milk or cream to be tested.

In the end frames $g$ of the spider G are sockets $h$, of somewhat larger diameter than the tubes or bottles H, and at the bottoms of these sockets are rubber or other elastic cushions $i$, which form yielding seats for the tubes when the latter are thrown outward by the centrifugal action. The tubes are corked, so as to prevent the escape of the liquid.

In a cross-head $e$ on the spider G are formed pockets for the tubes H, the tubes being retained in the pockets by an elastic fastening $f$, which in the present instance is a simple coiled spring, so as to allow for the contraction and expansion of the tubes as the machine is revolved. The tubes being placed in position in the pockets, as shown in Fig. 2, the machine is set in motion by turning the spur-wheel C, so as to effect such a rapid rotation of the spider that the cream and milk will be separated by the centrifugal action, owing to their different specific gravities. When separation is effected, the relative quantities of cream and milk can be indicated by a suitable gage $k$, attached by a chain $k'$ to the machine, this gage having a seat $k^2$ for the glass and a series of graduations, so that by placing the tube upon the gage the proportion of cream contained in the milk can be readily ascertained by comparing the line of cream with the indicating-mark on the gage.

This testing-machine is especially adapted for use by dairymen in comparing the milk of different cows and also for the use of milkmen in cities, particularly where milk is obtained from different dairymen or from different parts of the country, so that by testing the milk on delivery payment can be made in accordance with the quality of the milk, and the machine is also adapted for use by large buyers of milk in order to ascertain the quality of the purchase. After the cream is separated from the milk acid or rennet can be added to the milk, so as to separate the water therefrom, the proportion of water being thus readily ascertained.

I have found that by placing horizontally the shaft to which the spider is attached I am enabled to much more readily separate the cream from the milk than if the shaft of the machine is arranged vertically, for in a vertical-shaft machine the spider and its test-tubes are horizontal, and the natural tendency of the cream to rise on the milk causes it to seek and cling to the upper side of the tube, and this interferes with the ready separation of the cream by centrifugal action.

It will be evident that by placing the shaft of the rotating spider horizontally I effectually overcome this objection.

In Fig. 5 I have shown my device as constructed for separating the cream from the milk, instead of merely as a tester, the spider being driven by power and the test-tubes (shown in Figs. 1 and 2) being replaced by small cans H', each preferably having a gage-glass $m$ in the side, so that when the cream is separated from the milk it can be readily observed without removing the can from the machine.

An outlet-spigot is provided at the bottom of each can, so that the skimmed milk in the can may be readily drawn off.

The cans H' may be securely attached to the spider in any suitable manner, or may be secured by the elastic fastening $f$, if desired.

I claim as my invention—

1. The combination, in a milk testing or separating machine, of the frame, an open-armed spider mounted on said frame, and mechanism, substantially as described, for driving the spider, said spider having sockets with yielding seats therein, cross-heads $e$ on the spider, having pockets, glass tubes adapted to the sockets and pockets, and an elastic fastening passing transversely across the tubes, substantially as set forth.

2. The combination of the testing-tubes with the spider having arms with pockets for said tubes and elastic retainers for holding the tubes in the pockets, substantially as described.

In testimony whereof I have signed my name to this specification in the presence of two subscribing witnesses.

DYER COOPER.

Witnesses:
WILLIAM D. CONNER,
HARRY SMITH.